United States Patent
James

(10) Patent No.: US 8,733,786 B1
(45) Date of Patent: May 27, 2014

(54) RECREATIONAL CART ASSEMBLY

(76) Inventor: Nadia S. James, Brooklyn, NY (US)

( * ) Notice: Subject to any disclaimer, the term of this patent is extended or adjusted under 35 U.S.C. 154(b) by 293 days.

(21) Appl. No.: 13/181,267

(22) Filed: Jul. 12, 2011

(51) Int. Cl.
B62B 1/00 (2006.01)

(52) U.S. Cl.
USPC ... 280/651; 280/47.34; 280/79.2; 280/DIG. 3

(58) Field of Classification Search
USPC .............. 280/DIG. 3, 651, 652, 654, 639, 35, 280/47.34, 79.2; 297/256.17; 220/6, 4.29
See application file for complete search history.

(56) References Cited

U.S. PATENT DOCUMENTS

| | | | |
|---|---|---|---|
| 3,677,571 A | 7/1972 | Maturo, Jr. et al. | |
| 4,323,260 A | 4/1982 | Suchy | |
| 4,703,944 A | 11/1987 | Higson | |
| 4,765,646 A * | 8/1988 | Cheng | 280/651 |
| 4,865,346 A * | 9/1989 | Carlile | 280/654 |
| 5,100,198 A | 3/1992 | Baltzell | |
| D334,640 S * | 4/1993 | Forish | D34/24 |
| 5,269,157 A | 12/1993 | Ciminelli et al. | |
| 5,294,158 A * | 3/1994 | Cheng | 280/641 |
| D345,842 S | 4/1994 | Sloan et al. | |
| 5,636,852 A | 6/1997 | Sistrunk et al. | |
| 5,857,226 A * | 1/1999 | Sommer | 4/496 |
| 5,915,722 A * | 6/1999 | Thrasher et al. | 280/649 |
| 6,113,129 A | 9/2000 | Marques et al. | |
| 6,540,239 B2 * | 4/2003 | Lee, Jr. | 280/33.993 |
| 6,598,898 B2 * | 7/2003 | Chu | 280/652 |
| 6,883,267 B1 * | 4/2005 | Pruitt | 43/54.1 |
| 7,204,509 B1 * | 4/2007 | Vanderminden | 280/652 |
| 7,819,407 B1 * | 10/2010 | Charitun | 280/47.18 |
| 7,819,467 B1 * | 10/2010 | Schimmeyer | 297/14 |
| 7,963,530 B1 * | 6/2011 | Garcia | 280/30 |
| 8,109,477 B1 * | 2/2012 | Blasbalg | 248/98 |
| 8,128,103 B1 * | 3/2012 | Schutzendorf et al. | 280/33.993 |
| 8,186,755 B2 * | 5/2012 | Lovley | 297/184.15 |
| 2002/0149163 A1 * | 10/2002 | Lee, Jr. | 280/33.993 |

* cited by examiner

Primary Examiner — Katy M Ebner
Assistant Examiner — Emma K Frick

(57) ABSTRACT

A recreational cart assembly is provided for facilitating transportation of multiple items desired for use at a recreational site such as a park or beach. The assembly includes a basket having a back panel, a bottom panel, a front panel, and a pair of side panels. The side panels extend between the front panel and the back panels. The bottom panel extends between the side panels and between the front panel and the back panel. A plurality of wheels and a handle are coupled to the basket. The basket also has a plurality of openings. A collapsible chair is provided having a hook. The hook is inserted through and engages an opening in the basket whereby the chair is coupled to the basket.

9 Claims, 5 Drawing Sheets

RECREATIONAL CART ASSEMBLY

BACKGROUND OF THE DISCLOSURE

Field of the Disclosure

The disclosure relates to cart devices and more particularly pertains to a new cart device for facilitating transportation of multiple items desired for use at a recreational site such as a park or beach.

SUMMARY OF THE DISCLOSURE

An embodiment of the disclosure meets the needs presented above by generally comprising a basket having a back panel, a bottom panel, a front panel, and a pair of side panels. The side panels extend between the front panel and the back panels. The bottom panel extends between the side panels and between the front panel and the back panel. A plurality of wheels and a handle are coupled to the basket. The basket also has a plurality of openings. A collapsible chair is provided having a hook. The hook is inserted through and engages an opening in the basket whereby the chair is coupled to the basket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
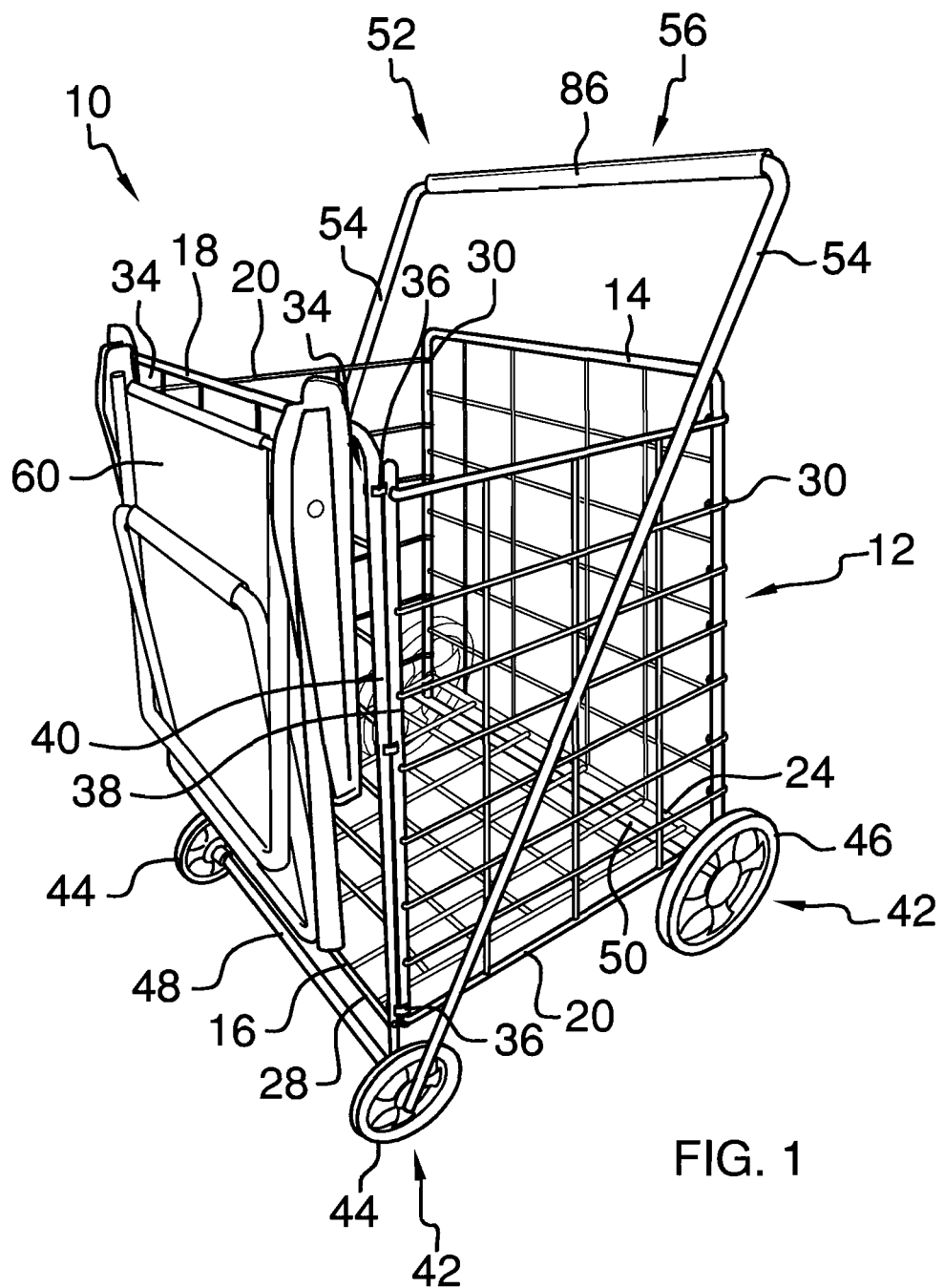
FIG. 1 is a top front side perspective view of a recreational cart assembly according to an embodiment of the disclosure.
Figure 2:
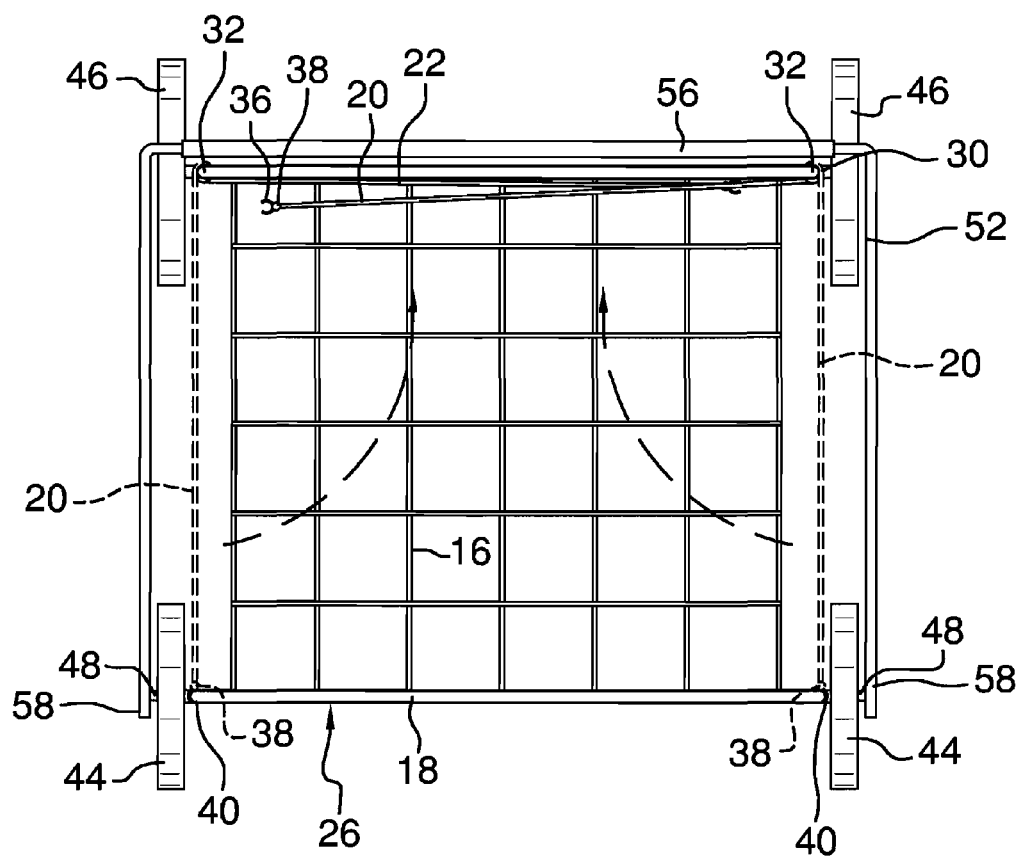
FIG. 2 is a top view of an embodiment of the disclosure.
Figure 3:
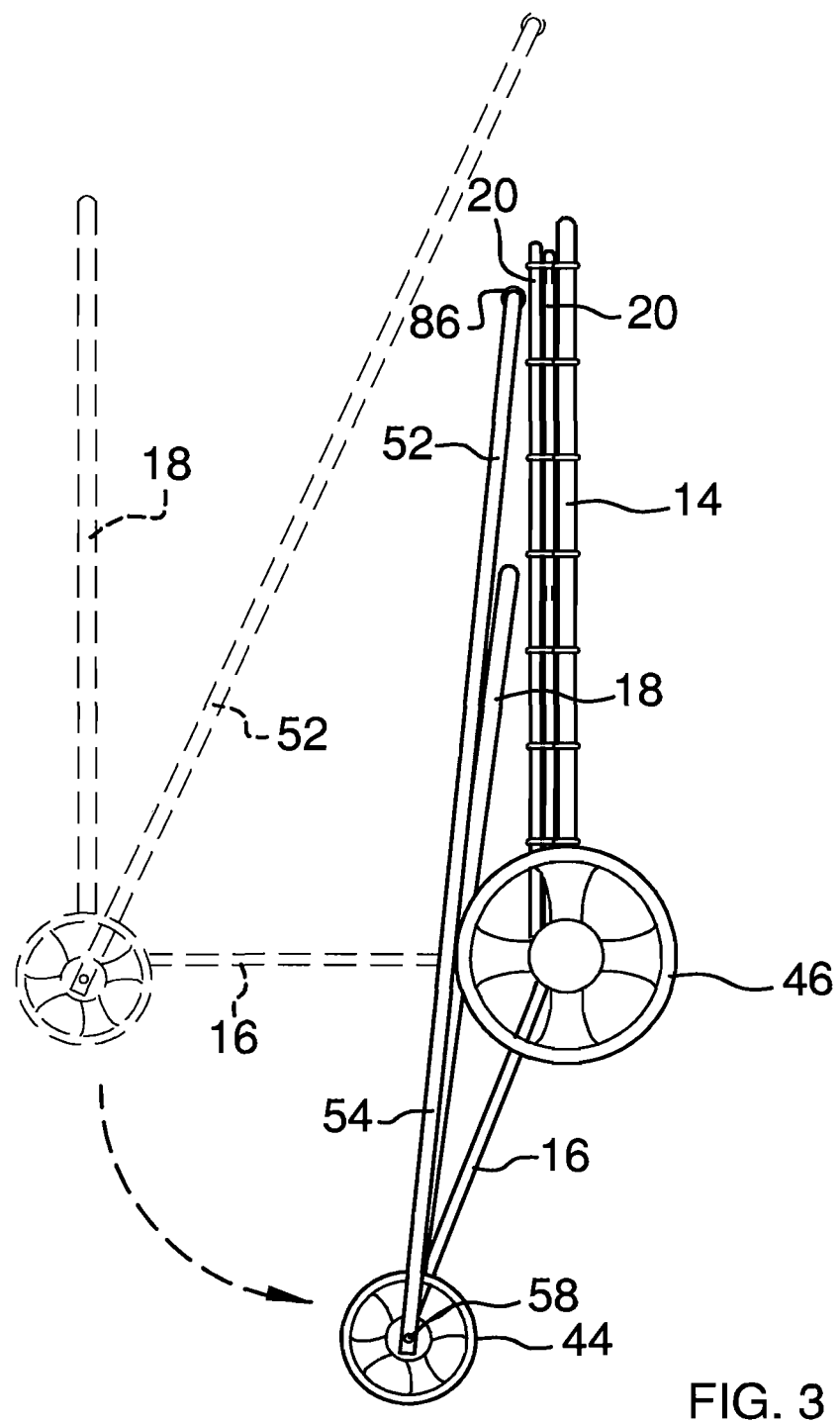
FIG. 3 is a side view of an embodiment of the disclosure.

With reference now to the drawings, and in particular to FIGS. 1 through 7 thereof, a new cart device embodying the principles and concepts of an embodiment of the disclosure and generally designated by the reference numeral 10 will be described.

As best illustrated in FIGS. 1 through 7, the recreational cart assembly 10 generally comprises a basket 12 having a back panel 14, a bottom panel 16, a front panel 18, and a pair of side panels 20. The side panels 20 extend between the front panel 18 and the back panels 14. The bottom panel 16 extends between the side panels 20 and between the front panel 18 and the back panel 14. More particularly, the bottom panel 16 has a rear edge 22 pivotally coupled to a bottom edge 24 of the back panel 14. Similarly, the bottom panel 16 has a forward edge 26 pivotally coupled to a bottom edge 28 of the front panel 18. The side panels 20 each have a rear edge 30 pivotally coupled to an associated one of a pair of side edges 32 of the back panel 14. The basket 12 has a plurality of openings 34. The openings 34 may be formed in the back panel 14. The back panel 14, side panels 20, and front panel 18 may all be formed into screens or grids having a plurality of openings 34 upon which items may be hung using some form of hook.

A plurality of clips 36 couple a forward edge 38 of each side panel 20 to an associated one of a pair of side edges 40 of the front panel 18. The clips 36 are selectively detachable from either the front panel 18 or the side panel 20 to permit each side panel 20 to pivot freely with respect to the back panel 14. Thus, the basket 12 is collapsible by folding the front panel 18, bottom panel 16, and back panel 14 together. The side panels 20 are folded in towards the back panel 14.

A plurality of wheels 42 is coupled to the basket 12. The wheels 42 include a pair of front wheels 44 and a pair of rear wheels 46. The rear wheels 46 may have a greater diameter than a diameter of the front wheels 44. A front axle 48 extends between the front wheels 44 and a rear axle 50 extends between the rear wheels 46. A handle 52 is coupled to the basket 12. More particularly, the handle 52 is generally U-shaped having a pair of spaced arms 54 and a transverse gripping portion 56 coupled to and extending between the spaced arms 54. Each arm 54 has a distal end 58 relative to the gripping portion 56 which is pivotally coupled to the front axle 48. The arms 54 may be positioned to extend outside of the front wheels 44 such that the basket is positioned between the arms 54. The gripping portion 56 may be covered by a pad 86.

A collapsible chair 60 is provided. The chair 60 has a frame portion 62 and a support portion 64. The support portion 64 may be a sheet of material 66 as shown, woven strands, or another conventionally known method of providing a lightweight, portable collapsible seating device with a support frame. The frame portion 62 has a back section 68 and a seat section 70. The back section 68 is foldable relative to the seat section 70. A collapsible canopy 72 may be coupled to the back section 68 of the frame portion 62 and extendable over the seat section 70. A pair of hooks 74 is coupled to the back section 68 of the frame portion 62 of the chair 60. The hooks 74 may be inserted through a pair of the openings 34 in the front panel 18 of the basket 12 engaging the basket 12 whereby the chair 60 is coupled to the basket 12.

Figure 4:
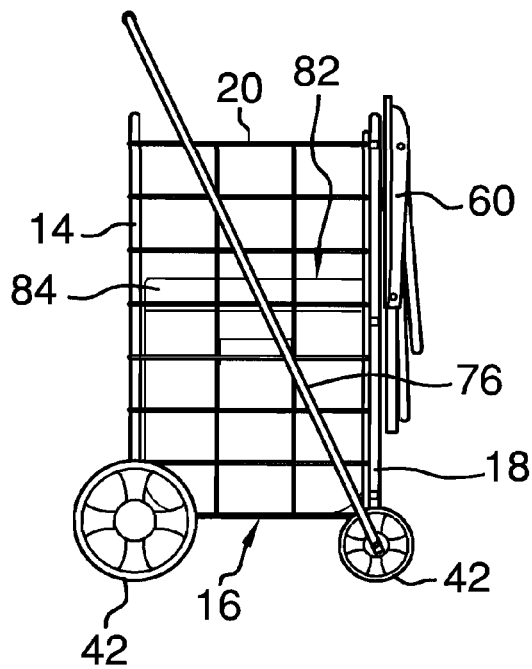
FIG. 4 is a side view of an embodiment of the disclosure.
Figure 5:
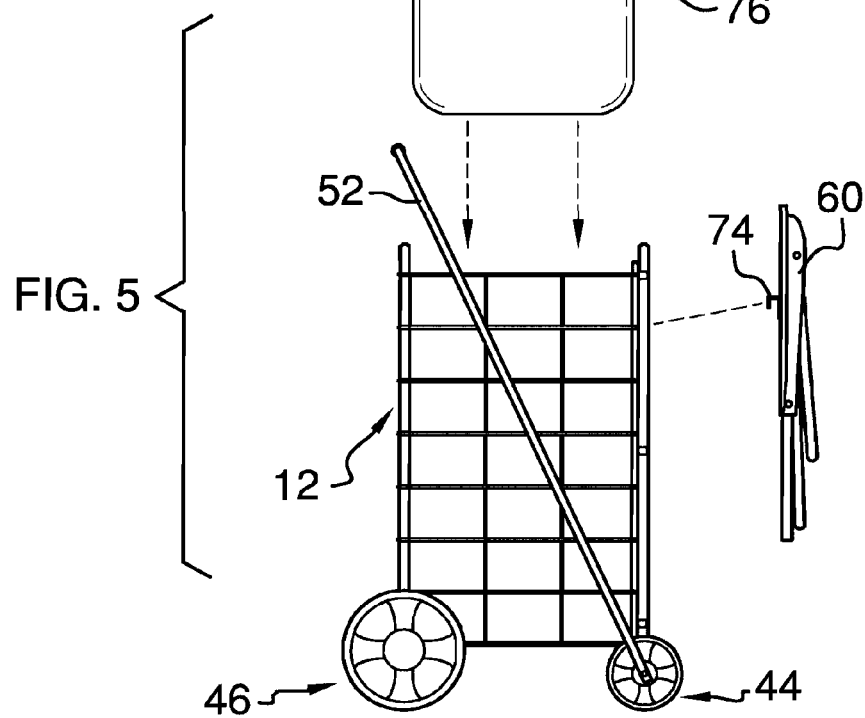
FIG. 5 is a partially exploded view of an embodiment of the disclosure.
Figure 6:
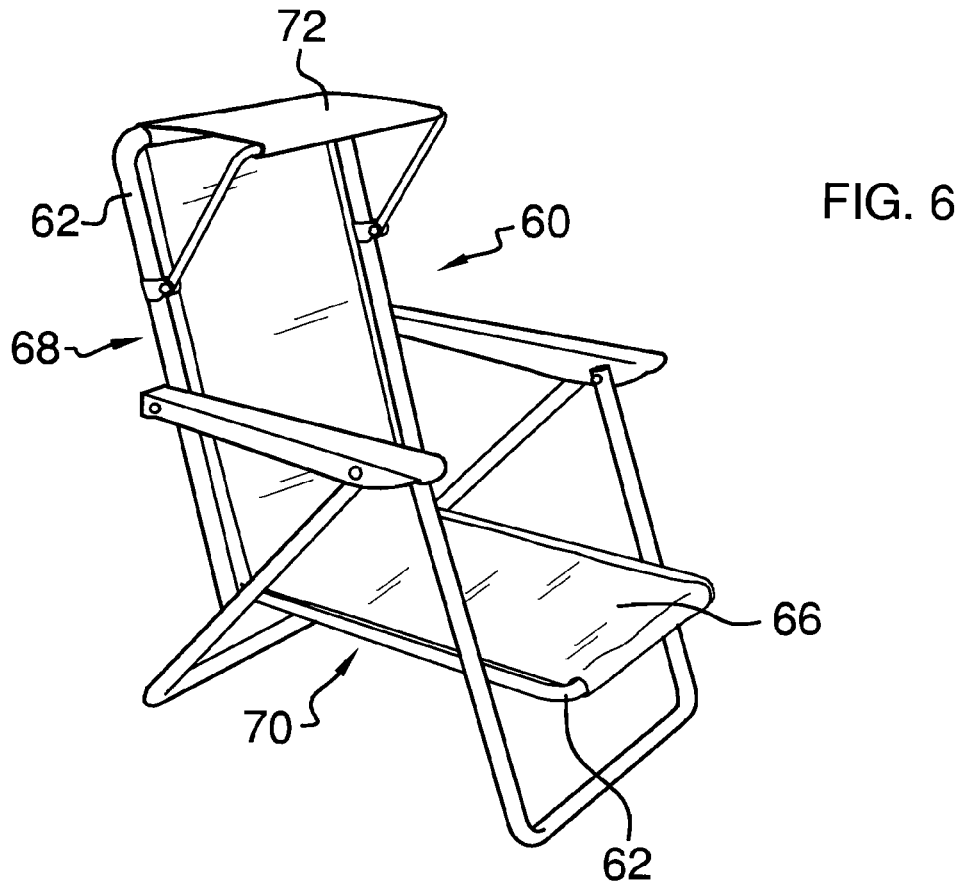
FIG. 6 is a top front side perspective view of a chair of an embodiment of the disclosure.
Figure 7:
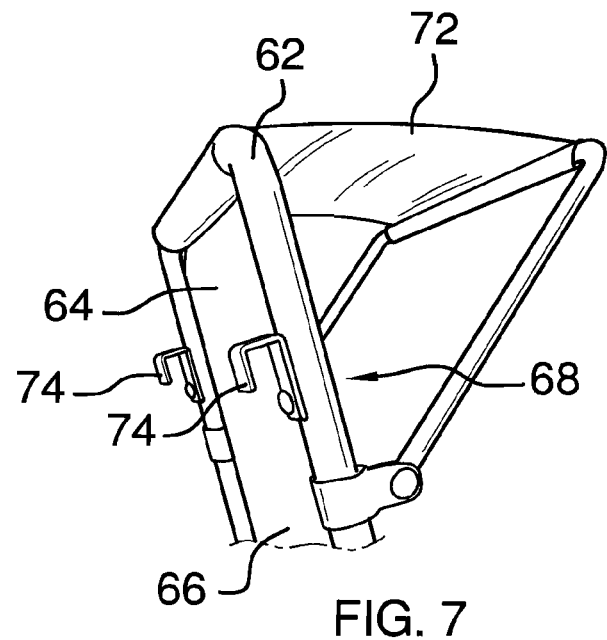
FIG. 7 is a partial bottom rear side view of a chair of an embodiment of the disclosure.

A cooler 76 is sized to be complimentary to the basket 12 and insertable into the basket 12 through an open top 78 of the basket 12 when the basket 12 is expanded into a use position 80 as shown in FIG. 4. The cooler 76 may have a flat top surface 82 usable as a table positioned within an interior of the basket 12. The cooler 76 is contemplated as a thermally insulated container equally capable of holding items retained within at a either a high or low temperature as desired.

In use, the basket 12 is expanded and secured together using the clips 36. The chair 60 is attached and the cooler 76 may be positioned in the basket 12. Additional items may be placed in the basket 12 on the cooler 76 if desired. The cart assembly 10 may be moved by pushing or pulling the handle 52 to a desired location. The chair 60 may then be removed and expanded and the basket 12 emptied of any items. The cooler 76 may be accessed by removal of a top 84 and left in the basket 12 or removed from the basket 12 as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A recreational cart assembly comprising:
   a basket having a back panel, a bottom panel, a front panel, and a pair of side panels, said side panels extending between said front panel and said back panels, said bottom panel extending between said side panels and between said front panel and said back panel, said bottom panel having a rear edge pivotally coupled to a bottom edge of said back panel, said bottom panel having a forward edge pivotally coupled to a bottom edge of said front panel, said side panels each having a rear edge pivotally coupled to an associated one of a pair of side edges of said back panel;
   a plurality of clips coupling a forward edge of each said side panel to an associated one of a pair of side edges of said front panel, said clips being selectively detachable to permit each side panel to pivot with respect to said back panel whereby said basket is collapsible, said clips inhibiting pivotal movement of each said side panel with respect to said back panel when each of said clips are coupled between said front panel and an associated said side panel;
   a plurality of wheels coupled to said basket;
   a handle coupled to said basket;
   said basket having a plurality of openings;
   a collapsible chair; and
   a hook coupled to said chair, said hook being inserted through and engaging one of said openings in said basket whereby said chair is coupled to said basket.

2. The assembly of claim 1, further including a cooler insertable into said basket through an open top of said basket.

3. The assembly of claim 1, further including a canopy coupled to said chair.

4. The assembly of claim 3, wherein said canopy is collapsible.

5. The assembly of claim 1, further comprising:
   said wheels including a pair of front wheels and a pair of rear wheels;
   a front axle extending between said front wheels; and
   a rear axle extending between said rear wheels.

6. The assembly of claim 5, further comprising:
   said handle having a pair of spaced arms and a transverse gripping portion coupled to and extending between said spaced arms; and
   a distal end of each arm relative to said gripping portion of said handle being pivotally coupled to said front axle.

7. The assembly of claim 5, further including said rear wheels having a greater diameter than a diameter of said front wheels.

8. The assembly of claim 5, further comprising said rear wheels being positionable in spaced relationship relative to said front wheels such that a bottom of each of said rear wheels is positionable above an associated one of said front wheels.

9. A recreational cart assembly comprising:
   a basket having a back panel, a bottom panel, a front panel, and a pair of side panels, said side panels extending between said front panel and said back panels, said bottom panel extending between said side panels and between said front panel and said back panel, said bottom panel having a rear edge pivotally coupled to a bottom edge of said back panel, said bottom panel having a forward edge pivotally coupled to a bottom edge of said front panel, said side panels each having a rear edge pivotally coupled to an associated one of a pair of side edges of said back panel, said basket having a plurality of openings;
   a plurality of clips coupling a forward edge of each said side panel to an associated one of a pair of side edges of said front panel, said clips being selectively detachable to permit each side panel to pivot with respect to said back panel whereby said basket is collapsible, said clips inhibiting pivotal movement of each said side panel with respect to said back panel when each of said clips are coupled between said front panel and an associated said side panel;
   a plurality of wheels coupled to said basket, said wheels including a pair of front wheels and a pair of rear wheels, said rear wheels having a greater diameter than a diameter of said front wheels, said rear wheels being positionable in spaced relationship relative to said front wheels such that a bottom of each of said rear wheels is positionable above an associated one of said front wheels;
   a front axle extending between said front wheels;
   a rear axle extending between said rear wheels;
   a handle coupled to said basket, said handle having a pair of spaced arms and a transverse gripping portion coupled to and extending between said spaced arms, a distal end of each arm relative to said gripping portion of said handle being pivotally coupled to said front axle;
   a collapsible chair, said chair having a frame portion and a support portion, said frame portion having a back section and a seat section, said back section being foldable relative to said seat section, a collapsible canopy coupled to said back section of said frame and extendable over said seat section of said frame;
   a pair of hooks coupled to said back section of said frame portion of said chair, said hooks being inserted through and engaging a pair of said openings in said basket whereby said chair is coupled to said basket; and
   a cooler insertable into said basket through an open top of said basket.

* * * * *